Patented Nov. 7, 1933

1,933,720

UNITED STATES PATENT OFFICE 1,933,720

PURIFICATION OF CELLULOSE DERIVATIVES

Camille Dreyfus, New York, N. Y., and George Schneider, Montclair, N. J., assignors to Celanese Corporation of America, a corporation of Delaware No Drawing. Application July 30, 1929
Serial No. 382,275

13 Claims. (Cl. 18—57)

This invention relates to the purification of cellulose derivatives, and relates more particularly to the separation from cellulose acetate or other organic esters of cellulose such impurities or ingredients that tend to lower the clarity of solutions or films made therefrom or which impart other undesirable characteristics thereto.

An object of this invention is to prepare cellulose acetate or other organic esters of cellulose from which a large proportion of such impurities that tend to lower the clarity of solutions, films and the like is removed. A further object of this invention is to remove from cellulose acetate or other esters of cellulose such ingredients that cause desensitized or oversensitized spots or areas in the photographic emulsions that are coated on films made from such esters of cellulose. Other objects of this invention will appear from the following detailed description.

Cellulose acetate, as ordinarily made, contains certain impurities that are not soluble or readily soluble in the organic liquids employed for dissolving the same, and consequently these impurities lower the clarity of solutions, films and the like made therefrom. Moreover such cellulose acetate contains materials that have a direct effect on photographic emulsions, with the result that if photographic films are made by coating a film base containing such cellulose acetate with a photographic emulsion, upon subsequent development of the photographic film, spots are formed on the photographic emulsion that impair the photographic value of the film.

Now we have found that if cellulose acetate or other organic esters of cellulose, which contain these impurities or deleterious substances are ground, and the ground cellulose acetate is then passed through a screen or sieve of appropriate mesh, the coarser particles retained by the screen are substantially free of these impurities or deleterious substances, while the finer particles that pass through the screen contain substantially all of these impurities.

In accordance with this invention, an organic ester of cellulose such as cellulose acetate is ground to a suitable state of sub-division and the coarser particles are separated from the finer particles by any suitable method, such as passing the same through a sieve of suitable mesh. The coarser portion of the cellulose acetate which is retained by the screen is found to be much freer of the objectionable impurities or ingredients than the original material treated or than the finer material that passes through the sieve.

While this invention is of particular importance in the treatment of cellulose acetate, it may be applied to the treatment of other organic esters of cellulose such as cellulose formate, cellulose propionate and cellulose butyrate, which esters of cellulose are preferably formed by esterification of cellulose in the presence of sulfuric acid as a catalyst. Thus the cellulose acetate may be produced by esterifying cotton linters or other cellulosic material with acetic anhydride in the presence of acetic acid as a solvent or diluent and of sulfuric acid as a catalyst. The thick viscous solution formed after the acetylation may be precipitated by the addition of a large quantity of water, with or without previous hydrolysis known as ripening to develop the desired solubility characteristics.

The cellulose acetate or other organic ester of cellulose, after its precipitation from the solution in which it is formed, is then ground to any suitable degree of fineness. Generally it has been found that if the same is ground until substantially all passes through a screen having 5 meshes to the inch, excellent results are obtained. However the amount of grinding will vary with the particular kind of cellulose acetate or other cellulose ester to be treated.

For the separation of the impurities, the ground cellulose acetate or other cellulose derivative is passed through a screen having 30 to 60 mesh per inch, preferably 40 mesh. In the selection of the mesh, various economic considerations enter. The coarser the mesh employed, the more pure will be the cellulose acetate retained on the screen. Thus if only a 6 or 10 mesh screen is employed, the coarser particles are substantially free of the impurities, while the cellulose acetate passing through the finer mesh contains more of the impurities until the point is reached where the very fine material passing through a 100 mesh or 200 mesh screen has most of the impurities. If desired, the cellulose acetate material may be classified by passing the same through a series of screens having say 6 mesh, 10 mesh, 20 mesh, 40 mesh, 80 mesh, 100 mesh and 200 mesh per inch, and the fraction retained on each screen may be employed for that use to which it is best adapted.

The coarser particles retained by the screen produce solutions, films and the like that are clearer than those produced from the original starting material. Because of this higher clarity, the purified cellulose acetate may be used for making filaments, yarn, films, clear lacquers or dopes, sheets, films, laminated glass, and the like, where high clarity and freedom from color are desirable.

An important application of this invention is in the making of photographic film base for use in cinetomatic or other photographic films. As has been stated, the cellulose acetate or other cellulose ester employed as the starting material contains constituents that tend to over-sensitize or desensitize photographic emulsion coated on film base made therefrom, and upon developing the photographic film made in this manner, small spots varying in size and number are apt to form on the photographic emulsion. However, if photographic film base is made from the coarser particles of cellulose acetate or other organic esters of cellulose that have been retained on the screen or sieve, photographic films made therefrom do not develop these spots to a substantial extent, the coarser the particles of cellulose acetate employed for this purpose, the less the number of spots produced.

The finer cellulose acetate or other cellulose derivative material that does pass through the screen and contains most of the impurities or objectionable ingredients, may be employed for purposes where clarity is of no importance, such as for making pigmented lacquers, celluloid-like articles containing pigments or filling material, filled or pigmented molding powders and the like.

It is to be understood that the foregoing detailed description is given merely by way of illustration, and that many variations may be made therein without departing from the spirit of this invention.

Having described this invention, what we claim and desire to secure by Letters Patent is:

1. Method of separating objectionable constituents from organic esters of cellulose comprising separating from ground organic ester of cellulose the finer particles from the coarser particles, whereby the coarser particles are freed from a substantial part of said objectionable constituents.

2. Method of separating objectionable constituents from cellulose acetate comprising separating from ground cellulose acetate the finer particles from the coarser particles, whereby the coarser particles are freed from a substantial part of said objectionable constituents.

3. Method of separating objectionable constituents from organic esters of cellulose comprising grinding the same and passing the ground organic ester of cellulose through a screen of 30 to 60 mesh, whereby the coarser particles retained on the screen are separated from a large proportion of such objectionable constituents.

4. Method of separating objectionable constituents from cellulose acetate comprising grinding the same and passing the ground cellulose acetate through a screen of 30 to 60 mesh, whereby the coarser particles retained on the screen are separated from a large proportion of such objectionable constituents.

5. Method of separating objectionable constituents from cellulose acetate comprising grinding the same and passing the ground cellulose acetate through a screen of about 40 mesh, whereby the coarser particles retained on the screen are separated from a large proportion of such objectionable constituents.

6. The method comprising grinding an organic ester of cellulose, separating the coarser from the finer particles, and working the coarser particles into articles such as films, yarns, sheets, solutions and the like.

7. The method comprising grinding cellulose acetate, separating the coarser from the finer particles, and working the coarser particles into articles such as films, yarns, sheets, solutions and the like.

8. The method of making film base that has substantially no deleterious effects upon photographic emulsions comprising grinding organic esters of cellulose, separating the coarser particles from the finer particles, and working the coarser particles into the form of photographic film base.

9. The method of making film base that has substantially no deleterious effects upon photographic emulsions comprising grinding cellulose acetate, separating the coarser particles from the finer particles, and working the coarser particles into the form of photographic film base.

10. Organic esters of cellulose in particulate form, the particles being of at least 40 mesh size, which are produced by grinding the precipitate derived from the solution in which they are formed and discarding the particles of smaller size.

11. Cellulose acetate in particulate form, the particles being of at least 40 mesh size, which are produced by grinding the precipitate derived from the solution in which it is formed and discarding the particles of smaller size.

12. Photographic film base that has substantially no deleterious effect upon photographic emulsions and formed from the coarser particles caught on a 40 mesh screen from ground organic esters of cellulose as derived from the solution in which they are formed.

13. Photographic film base that has substantially no deleterious effect upon photographic emulsions and formed from the coarser particles caught on a 40 mesh screen from ground cellulose acetate as derived from the solution in which it is formed.

CAMILLE DREYFUS.
GEORGE SCHNEIDER.